United States Patent
Harris et al.

(10) Patent No.: US 8,386,543 B1
(45) Date of Patent: Feb. 26, 2013

(54) REDUCED MEMORY USAGE FOR DIGITAL SIGNAL PROCESSING SYSTEM AND METHOD

(75) Inventors: Johnny M. Harris, Centerville, UT (US); Thomas R. Giallorenzi, Herriman, UT (US); Matt Lake, Salt Lake City, UT (US); Samuel C. Kingston, Salt Lake City, UT (US); Randal R. Sylvester, West Valley City, UT (US)

(73) Assignee: L-3 Communications Corp, New York, NY (US)

( * ) Notice: Subject to any disclaimer, the term of this patent is extended or adjusted under 35 U.S.C. 154(b) by 1548 days.

(21) Appl. No.: 11/540,340

(22) Filed: Sep. 28, 2006

(51) Int. Cl.
*G06F 7/00* (2006.01)

(52) U.S. Cl. .................. 708/200; 708/490; 711/100

(58) Field of Classification Search .............. None
See application file for complete search history.

(56) References Cited

U.S. PATENT DOCUMENTS

| | | | |
|---|---|---|---|
| 4,776,012 A | 10/1988 | Zscheile, Jr. et al. | |
| 5,495,509 A | 2/1996 | Lundquist et al. | |
| 5,600,569 A * | 2/1997 | Nishiyama et al. | 708/627 |
| 5,684,727 A * | 11/1997 | Campbell et al. | 708/422 |
| 7,492,810 B2 * | 2/2009 | Harrison | 375/150 |
| 2002/0124038 A1 * | 9/2002 | Saitoh et al. | 708/513 |
| 2004/0210610 A1 * | 10/2004 | Mukund et al. | 708/209 |

* cited by examiner

*Primary Examiner* — Michael D Yaary
(74) *Attorney, Agent, or Firm* — Kirton McConkie (57) ABSTRACT

A technique for reducing memory usage during signal processing includes storing least significant portions of a plurality of intermediate results in a first memory. Most significant portions of a subset the plurality of intermediate results are stored in a second memory having a smaller length than the first memory. A data linkage is maintained between the most significant portions and corresponding least significant portions.

23 Claims, 4 Drawing Sheets

REDUCED MEMORY USAGE FOR DIGITAL SIGNAL PROCESSING SYSTEM AND METHOD

FIELD OF THE INVENTION

The present invention relates generally to digital signal processing. More particularly, the present invention relates to reducing memory usage in a digital signal processing system.

BACKGROUND

Digital signal processing techniques prove useful in a variety of areas, including for example, radio communications systems, radar systems, audio and video equipment, and the like. Digital signal processing can be performed using custom hardware, application specific integrated circuits (ASIC), logic devices, field programmable gate arrays (FPGA), digital signal processor chips, and general microprocessors. Common to digital signal processing systems is that data being processed is represented as digital words, for example, binary data using 16 or 32 bits.

Wider data words allow for higher precision in the data being represented. This increased precision is also referred to as increased dynamic range. Generally, however, increased word widths tend to drive design costs. As word widths increase, the size of memories increases. This in turn necessitates using a larger amount of silicon area, for example, for additional transistors or logic blocks.

Challenges presented by wide data widths are compounded when intermediate results are temporarily placed in a memory for subsequent processing. For example, some signal processing operations include performing partial processing, storing intermediate results temporarily in a memory, and then performing additional processing using the intermediate results at a later time. The movement of large amounts of data back and forth between a signal processing element and a memory can be a bottleneck in the overall signal processing operations, consume large amounts of bandwidth on system busses, and present other challenges for system designers.

SUMMARY OF THE INVENTION

It has been recognized that it would be advantageous to develop a technique for reducing memory usage for storage of intermediate results during signal processing.

One embodiment of the invention includes performing a digital signal processing operation to produce a plurality of intermediate results. The intermediate results can include a most significant portion and a least significant portion. Least significant portions can be stored in a first memory having a first length. A subset of the intermediate results can be selected, and most significant portions of the selected subset of intermediate results can be stored in a second memory having a second length. The second length can be less than the first length. A data linkage between the most significant portions and corresponding least significant portions can be maintained.

Additional features and advantages of the invention will be apparent from the detailed description which follows, taken in conjunction with the accompanying drawings, which together illustrate, by way of example, features of the invention.

DETAILED DESCRIPTION

In describing the present invention, the following terminology will be used:

The singular forms "a," "an," and "the" include plural referents unless the context clearly dictates otherwise. Thus, for example, reference to a memory includes reference to one or more memories.

As used herein, the term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "5,000 or greater" should be interpreted to include not only the explicitly recited value of 5,000, but also include individual values and sub-ranges within the indicated range. Thus, included in this numerical range are individual values such as 10,000, 20,000, and sub-ranges such as 10,000-20,000 and greater than 100,000. This same principle applies to ranges reciting only one numerical value and should apply regardless of the breadth of the range or the characteristics being described.

As used herein, a plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

One signal processing operation which can produce intermediate results having a large dynamic range is correlation. Correlation is a technique for comparing the similarity of two signals (or the similarity of a time-shifted version of a signal with itself). For example, synchronization of received wireless signals can be performed by correlating samples of an input signal against a predefined replica. In a spread ALOHA system, correlation can be performed using a parallel correlator to regularly test all possible code phase offsets for input signals. Code phases producing large correlation values are indicative of incoming signal bursts having those code phases.

In general, a correlator may maintain a number of intermediate correlation results, which are updated periodically as additional input samples are received. The intermediate correlation results may correspond to a number of code phases. For example, correlation for a code of length 5,000 chips may have 10,000 candidate code phases corresponding to one-half chip time slips in code timing between each candidate code phase. For code phases that are aligned with an input signal, the intermediate correlation result will grow rapidly. Other code phases may not grow at all, and may maintain relatively small values which change due to random noise. Typically only a small number the intermediate correlation results will be large at any given time, corresponding to the presence of a small number of input signals.

Correlation is just one example of a signal processing operation that may produce intermediate results for which most of the values are small and only a few values are large. Spectral analysis techniques, such as a Fourier transform, may have similar characteristics when a small number of discrete spectral components are present. Other signal processing operations may have similar effects.

A straightforward way for providing storage of intermediate results is to provide a memory having the width of the intermediate results, and one memory location for each intermediate result to be stored. For example, a parallel correlator providing intermediate results for 10,000 different code phases can use a memory of length 10,000. Each memory location can be wide enough to store an intermediate result. Hence, for 16-bit data, a 10,000×16 bit memory can be used to store intermediate results.

When most of the intermediate results are relatively small, however, providing memory as just described can be inefficient. For example, 16-bit data can take on values in the interval [−32767, 32767] using a twos complement encoding. For intermediate results that fall within the interval [−511, 511], however, those intermediate results can be encoded in the ten least significant bits. If most of the intermediate results fall within the narrower range, providing memory for the full width of all results can be inefficient. This is because the most significant bits of most results are simply sign extension bits, containing little useful information.

One approach to reducing memory is to clip either the least significant portion or the most significant portion. Clipping may be undesirable, however, since it can reduce the available dynamic range of the system.

Memory can be reduced by storing the most significant portions (e.g. the 6 most significant bits) of the intermediate results of only those intermediate results for which the most significant bits contain useful information. Useful information may be defined in various ways, including, for example, that the most significant bits are not simply sign extension bits. Intermediate results which have overflowed the ten least significant bits may have their full sixteen bits stored. Other intermediate results may have only their ten least significant bits stored. Using such an approach can allow significant amounts of memory to be saved, reducing silicon real estate and bus bandwidths. Maintaining a data linkage between the most significant portions and the corresponding least significant portions is helpful to allow the portions to be reassembled for later use.

Figure 1:
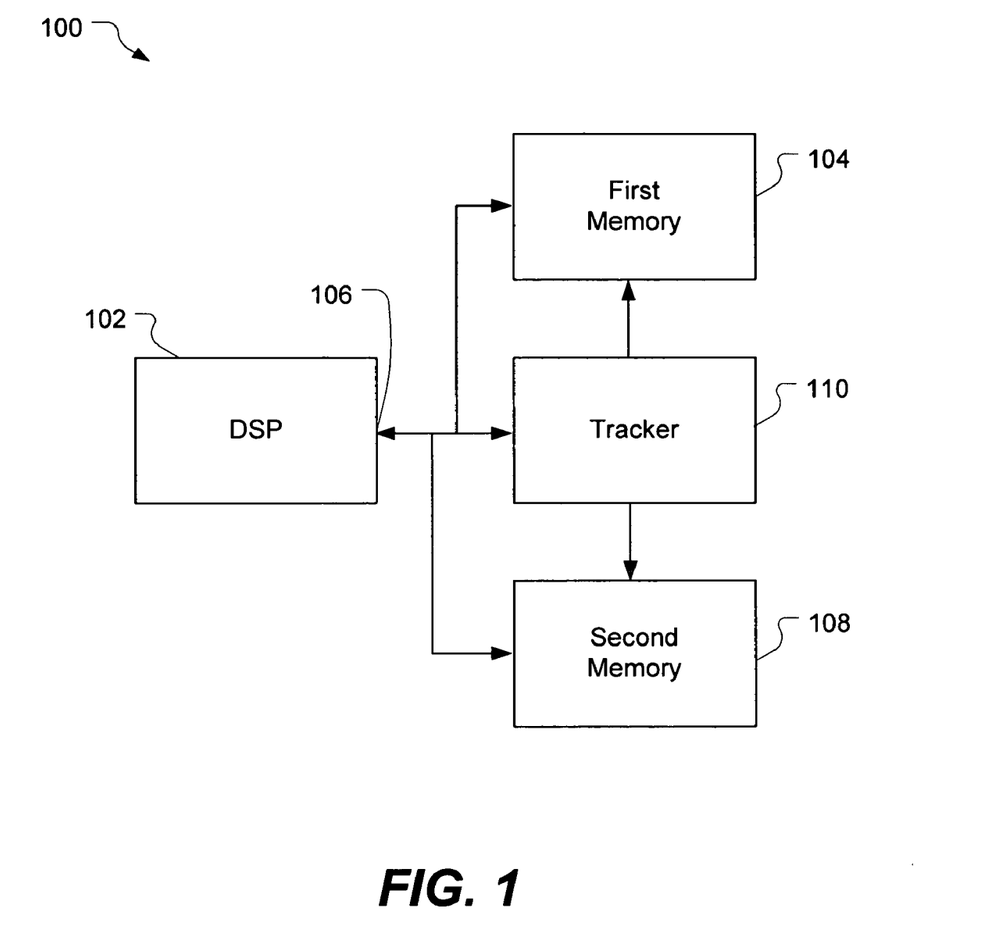
FIG. 1 is a block diagram of a device for reducing memory usage in a digital signal processing system in accordance with an embodiment of the present invention.

FIG. 1 illustrates a device for reducing memory usage in a digital signal processing system in accordance with an embodiment of the present invention. The device, shown generally at 100, includes a digital signal processor 102. The digital signal processor may be, for example, discrete hardware components, configurable logic blocks within a field programmable gate array (FPGA), signal processing circuitry within an application specific integrated circuit (ASIC), a programmable digital signal processor, or similar digital signal processing components. For example, the entire device may be implemented within an integrated circuit, such as an ASIC or FPGA. The digital signal processor may implement correlation or similar digital signal processing operations.

Coupled to the digital signal processor 102 is a means for storing least significant portions of the plurality of intermediate results. For example, the means for storing least significant portions of the intermediate results may be a first memory 104 coupled to a memory interface 106 of the digital signal processor. The first memory has a first width and a first length. For example, the first length may equal the number of intermediate results and the first width may equal the width of the least significant portions of the intermediate results.

Also coupled to the digital signal processor 102 is a means for storing most significant portions of a subset of the plurality of intermediate results. For example, the means for storing most significant portions may be a second memory 108 coupled to the memory interface 106 of the digital signal processor. The second memory has a second width and a second length, the second length being smaller than the first length. In other words, the second memory has a number of memory locations less that the total number of intermediate results. For example, the second width may equal the width of the most significant portions of the intermediate results.

The separation of least significant portions and most significant portions can be a fixed boundary. For example, intermediate results may be 12 bits wide, and separated into a 4-bit least significant portion and an 8-bit most significant portion. As another example, intermediate results may be 16 bits wide, and separated into a 6-bit least significant portion and a 10-bit most significant portion. Of course, other word sizes and partitions between the most significant and the least significant portions may prove useful depending on the specific application and statistics of the signals being processed.

The system 100 includes means for reconstructing most significant portions of the subset of the plurality of intermediate results upon retrieval of the corresponding least significant portions. For example, the means for storing the most significant portion may include means for detecting an overflow in the least significant portion, and most significant portions may be stored only when there has been an overflow. The means for reconstructing most significant portions may therefore include means for extending a sign of the least significant portions when no corresponding most significant portion has been stored. Various circuits and logic implementations for overflow detection and sign can be used in the system. Other implementations of a means for reconstructing the most significant portions can also be used as will be appreciated from the following discussion.

The system can include a tracker 110 coupled to the first memory 104 and to the second memory 108 to maintain a correspondence between the least significant portions and the most significant portions of the intermediate results. The tracker helps to reconstruct the intermediate results when they are retrieved from the first memory and second memory. Various implementations of the tracker are possible, as will now be illustrated.

Figure 2:
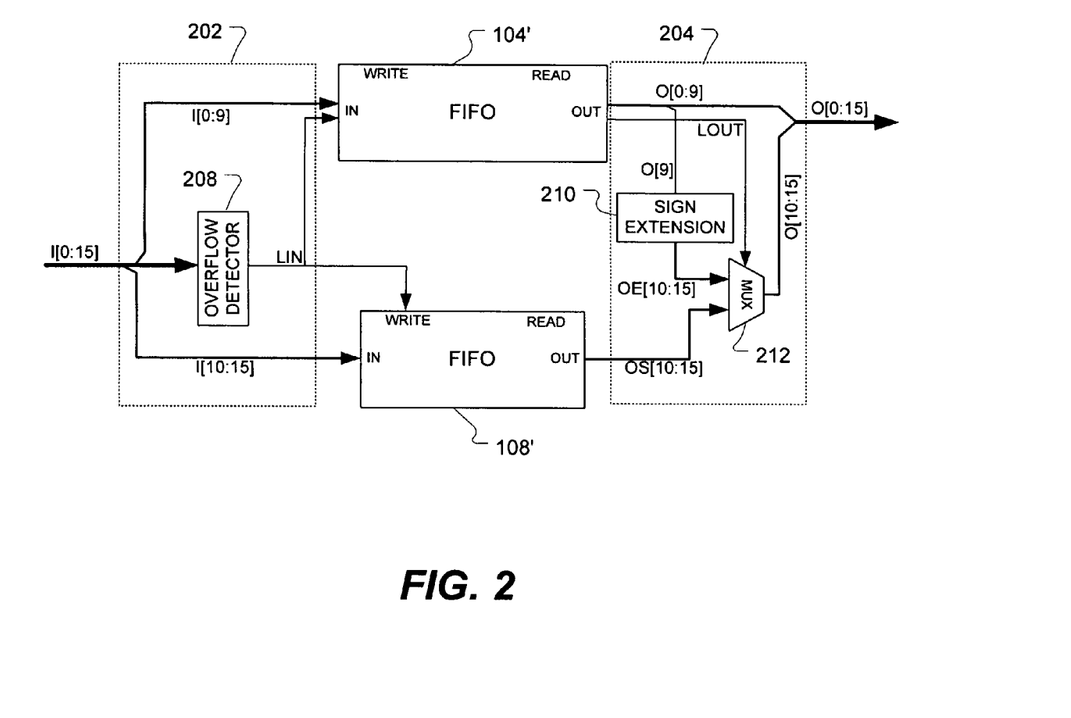
FIG. 2 is a block diagram of a device for reducing memory usage in a digital signal processing system in accordance with another embodiment of the present invention.

FIG. 2 illustrates a tracker in accordance with one embodiment of the present invention. The tracker includes an input portion 202 and an output portion 204, and interfaces to a first memory 104' and second memory 108' which are each operated as first-in first-out memories. The example is shown for intermediate results having a word size of 16 bits, which can be separated into least significant portions of 10-bit width and most significant portions of 6-bit width. Input and output of intermediate results are shown on separate input and output busses, although these busses can be combined using various digital implementation. The input intermediate results I[0:15] are separated into least significant portion I[0:9] and most significant portion I[10:15]. The least significant portions I[0:9] are stored in the first memory, and augmented with a linkage bit LIN. The linkage bit is set whenever an overflow is detected by the overflow detector detector circuit 208. The linkage bit LIN is stored along with the least significant portion I[0:9] in the first memory. When the linkage bit is set, the most significant portion I[10:15] of the intermediate result is stored in the second memory, and when the linkage bit is not set, no most significant portion is stored. The linkage bit thus helps to maintain a correspondence between the least significant portions and most significant portions.

On the output side, the tracker output portion 204 helps to reassemble output intermediate results O[0:15]. When the least significant portions O[0:9] are fetched from the first memory 104', if the output linkage bit LOUT is set, the corresponding most significant portions OS[10:15] are fetched from the second memory 108'. If the linkage bit is not set, the most significant portions OE[10:15] can be reconstructed using a sign extension circuit 210 to sign extend the least significant portion. A multiplexer 212 selects the most significant portion OS[10:15] from the second memory when available, and selects the sign extension OE[10:15] from the sign extender circuit, when no most significant portion is available from the second memory.

This implementation approach for the tracker uses one bit of memory for each least significant portion in addition to the number of bits in the least significant portion. Hence, the width of the first memory 104' can be equal to the width of the least significant portion plus one bit. The width of the second memory 108' can be equal to the width of the most significant portion.

Figure 3:
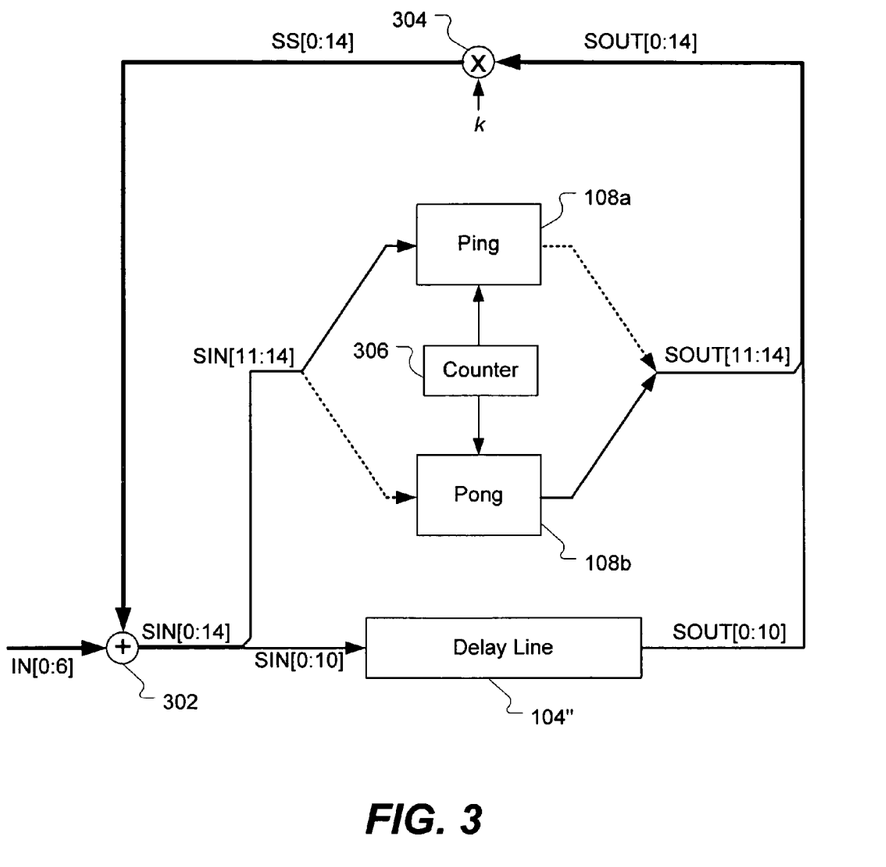
FIG. 3 is a block diagram of a device for reducing memory usage in a digital signal processing system in accordance with yet another embodiment of the present invention.

An alternate embodiment of a tracker is illustrated by FIG. 3 in accordance with an embodiment of the present invention. In this example, the signal processing operation is a leaky integration, for example, an integrator portion of a sliding correlator. The leaky integration is performed for an array of intermediate results, which are running totals. Running totals SOUT[0:14] are scaled by a coefficient k (generally, k<1) in multiplier 304 to form scaled totals SS[0:14] and summed with input samples IN[0:6] (e.g. correlator outputs) to form new running totals SIN[0:14]. The least significant portions SIN[0:10] of the running totals are maintained in a first memory 104", which can be a delay line. The most significant portions SIN[11:14] of a selected subset of the running totals are stored in a set of ping pong memories 108a, 108b. A counter 306 (for example, the delay count for a correlator) counts from 0 to N−1, where N is the total number of running totals being maintained. The counter can be used to track correspondence between least significant portions and most significant portions. Most significant portions can be stored in the ping pong memories along with a stored counter value to which they correspond. When the counter value is repeated later, the most significant portion SOUT[11:14] can be retrieved along with the least significant portion SOUT[0:10]. The most significant portion and least significant portion can be joined to form the complete running total SOUT[0:14].

The use of ping and pong memories can help simplify the implementation, since one memory can be written while the other is being read. For example, most significant portions SIN[11:14] can be written into the ping memory 108 while the most significant portions SOUT[11:14] are read out of the pong 108b memory (solid lines). During the next cycle of the counter, the roles of the ping and pong memories can be swapped, writing to the pong memory and reading from the ping memory (dashed lines).

The tracker can include sign extension, overflow detection, multiplexing, and similar techniques as described above, although they are not illustrated here.

It will be appreciated that running totals may increase or decrease during iteration of the signal processing operation. Thus, new running totals SIN may overflow during some iterations, resulting in additional entries in the ping and pong memories 108a, 108b. Conversely, some running totals that have previously overflowed may be reduced and no longer require most significant portions to be stored. Accordingly, usage of the ping and pong memories can be dynamic, with different running totals having their most significant portions being stored at different times.

The width of the delay line 104''' can be equal to the width of the least significant portion of the running totals. The width of the ping pong memories can be equal to the width of the most significant portion of the running totals plus the width of the counter. It will thus be appreciated that memory use for the implementation of FIG. 3 will differ from that of FIG. 2.

Various other implementations of a tracker are possible. In another embodiment, a tracker can be implemented by maintaining linkages between the least significant portions and most significant portions using memory addresses. For example, most significant portions can be stored in the second memory along with addresses corresponding to locations within the first memory of the corresponding least significant portions. Upon read out of a least significant portion from a particular address, the second memory can be searched for most significant portions which correspond to that particular address. It will be appreciated that the second memory may be a content addressable memory or associate memory to make this searching highly efficient.

As another example of memory based address linkage, addresses of most significant portions can be stored in the first memory along with the corresponding least significant portions. Upon read out of the least significant portion from a particular address of the first memory, a most significant portion (when present in the second memory) can be read from the second memory using the address stored with the least significant portion. Special addresses can be defined which indicate no most significant portion has been stored. As another example, special addresses in the second memory may hold certain fixed most significant portion values, such as sign extension bits.

It should be appreciated from the foregoing discussion that many other implementations of the tracker are possible. Different memory types can also be used, including for example random access memory, shift register memory, register file memory, first-in first-out memory, dual port memory, logic blocks within field programmable gate arrays, and the like. It is not necessary for the first memory and second memory to be of the same type.

Memory reductions achieved by the system are a function of the particular implementation of the tracker and the actual lengths of the first and second memories. The length of the second memory will depend on the particulars of the signal processing operation being performed. For example, in a spread ALOHA system, it is helpful to provide a number of locations in the second memory that are on the same order as the number of simultaneous signals which may be detected.

For example, if there is a peak of 10 users which are expected in the system, there may be 10 simultaneous signals. Each signal may result in large correlation results for 2 or 3 code phases, hence it may be desirable to provide a second memory having a second length of about 20-30, allowing for the most significant portions of about 20-30 intermediate results to be stored. Additional second memory locations may also be included to allow for large sidelobes that may be present, false alarms, or other spurious effects which may result in large intermediate results. In general, the length of the second memory can be determined based on the characteristics of the signal processing system. For example, if the intermediate results are stochastic signals, the statistics of overflow will be a function of signal to noise statistics, correlator length (gain), least significant portion width, and possibly other factors. Accordingly, various tradeoffs between system design parameters, such as memory widths and lengths are possible. The second length may be a fraction of the first memory length, for example, one tenth, one hundred, or even one thousand of the first length.

It should be appreciated that significant memory savings are possible using the techniques disclosed herein. While some additional complexity is introduced by the means for reconstructing the intermediate results (such as a tracker, counter, and similar circuitry described above), this additional complexity is offset by the reduced memory requirements in some signal processing applications. As an example, overall silicon usage can be significantly reduced for correlators having lengths of 5,000 taps or greater, and in particular for lengths of 10,000 taps or greater, and more particularly for lengths of 100,000 taps or greater.

For example, consider the exemplary situation where parallel correlation is performed over 10,000 different hypotheses, intermediate results are 16-bits in width, and a maximum of 50 of the intermediate results at any time have values which exceed that which can be stored in 6-bits. A full-size memory allowing all intermediate results to be stored in their full width uses 16×10,000=160,000 bits of memory (about 1 million transistors). In contrast, using the techniques disclosed herein, a first memory can have a size of 6×10,000=60,000 bits and a second memory can have a size of 50×10=500 bits for a total of 60,500 bits of memory (about 400 thousand transistors), a reduction of about 60% in memory usage. This reduced memory usage more than offsets the small amount of additional circuitry used for the tracker, resulting in a net savings in chip usage. Of course, as more hypotheses are included, for example, for very long codes (e.g., lengths of about 100,000 chips), the savings can be even greater. For very short codes (e.g., lengths of about 100 chips or lengths as used in current cellular systems) the savings in memory is much smaller and may not be worth the additional complexity. An additional benefit of the reduced memory usage is reduced bus width. This can be greatly beneficial when input/output bandwidth is limited.

Figure 4:
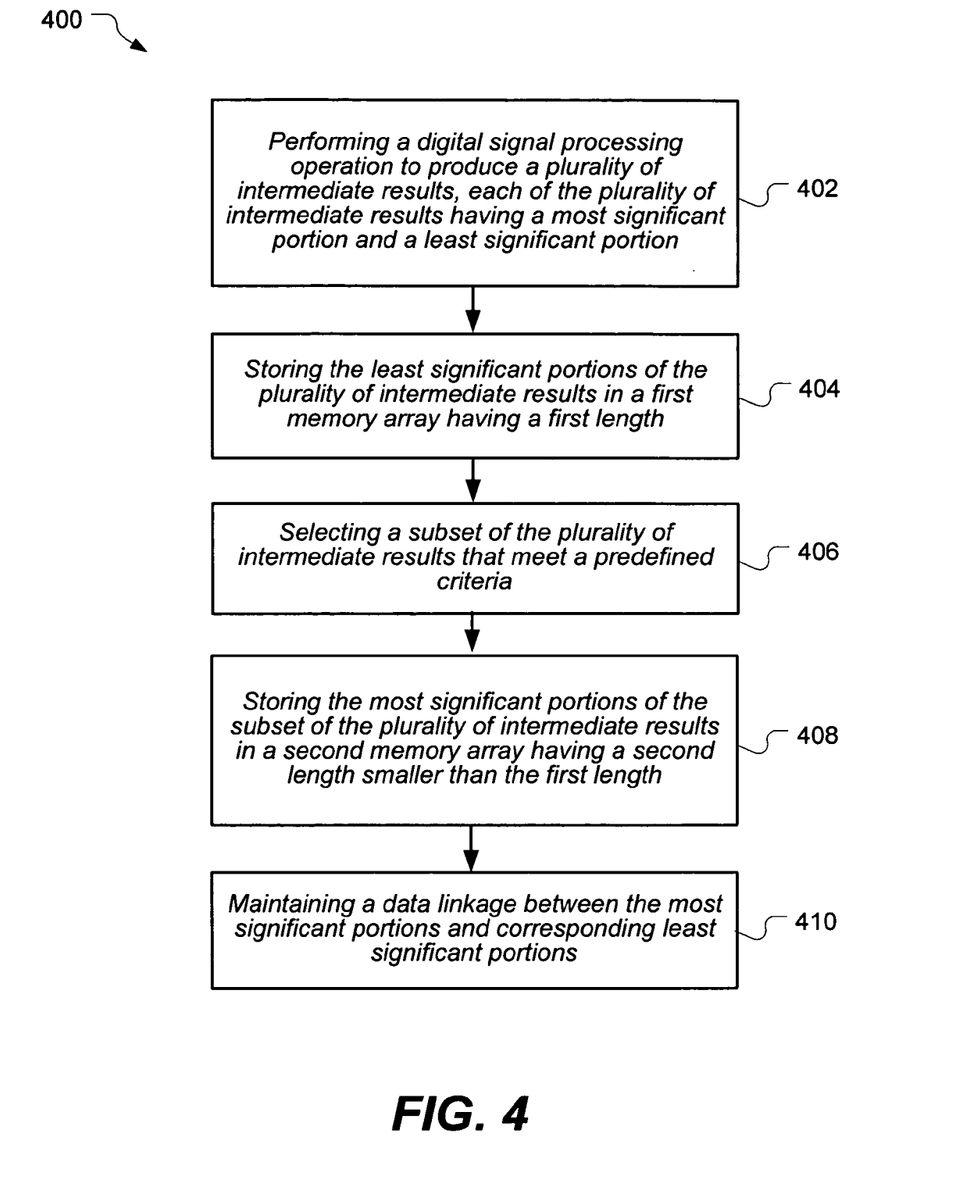
FIG. 4 is a flow chart of a method of reducing memory usage for storage of intermediate results during digital signal processing, in accordance with an embodiment of the present invention.

As a final example, a method of reducing memory usage for storage of intermediate results during digital signal processing will be described. The method, shown generally at 400, is illustrated in FIG. 4 in accordance with an embodiment of the present invention. The method may include performing 402 a digital signal processing operation to produce a plurality of intermediate results. Each intermediate result may be representable as a most significant portion and a least significant portion. The boundary between the most significant portion and least significant portion can be defined based on the characteristics of the signal processing operation, for example, as described above. The method may include storing 404 the least significant portions of the plurality of intermediate results in a first memory array having a first length.

The method 400 may also include selecting 406 a subset of the plurality of intermediate results that meet a predefined criteria. For example, intermediate results may be selected based on the criteria that the least significant portion has overflowed into the most significant portion. Overflow may be defined, for example, by the condition that the bits in the most significant portion are not all equal to the most significant bit (sign bit) of the least significant portion (e.g., for twos complement encoding). Overflow may also be defined, for example, by the condition that at least one bit in the most significant portion is non zero (e.g., for unsigned encoding). In general, intermediate results may be selected based on the criteria that the most significant portion contains information necessary to the signal processing operation. For example, sign extension information is not necessary since it can be easily reconstructed.

The method 400 may include storing 408 the most significant portions of the subset of the plurality of intermediate results in a second memory having a second length smaller than the first length. Because the second length is smaller than the first length, the subset of the intermediate results which are selected is therefore less than all of the intermediate results. By using a smaller second memory, overall memory savings are achieved as opposed to storing the most significant portions of all intermediate results.

The method 400 may include maintaining 410 a data linkage between the most significant portions and corresponding least significant portions. This enables the reconstruction of the full width of the intermediate results when being used for subsequent signal processing. Various ways of maintaining a data linkage between the most significant portions and corresponding least significant portions are described above.

While the discussion heretofore has focused principally on the examples where data is encoded in twos complement, the techniques may be readily adapted to sign-magnitude notation or other formats. In addition, while digital signal processing operations are presently performed primarily on binary encoded data, future non-binary encoding schemes may be implemented to which the present techniques are equally applicable.

In summary, it will be appreciated that the techniques disclosed herein can achieve memory savings in a digital signal processing system by eliminating storage for some of the partial results. Certain partial results can be handled as exception conditions, storing additional bits of precision (e.g. most significant portions) only when needed. The technique can provide significant memory savings in a communication system using parallel correlators having large numbers of taps. Such memory savings may be essential when implementing a system within a memory limited FPGA.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A method of reducing memory usage for storage of intermediate data results during digital signal processing, comprising:

performing a digital signal processing operation to produce a plurality of intermediate data results, each of the plurality of intermediate data results having a most significant portion and a least significant portion;

storing the least significant portions of the plurality of intermediate data results in a first memory array having a first length;

selecting a subset of the plurality of intermediate data results that meet a predefined criteria, wherein the selected subset comprises less than all of the plurality of intermediate data results;

storing the most significant portions of only the selected subset of the plurality of intermediate data results in a second memory array having a second length smaller than the first length, wherein the most significant portions of the intermediate data results not in the selected subset are not stored in the second memory; and maintaining linkage data for each individual one of the most significant portions stored in the second memory array at the step of storing the most significant portions, wherein the linkage data links each one of the individual most significant portions stored in the second memory array at the step of storing the most significant portions to the corresponding least significant portion stored in the first memory array at the step of storing the least significant portions.

2. The method of claim 1, wherein the predefined criteria is that the least significant portion has overflowed into the most significant portion.

3. The method of claim 1, wherein the predefined criteria is that the most significant portion contains information necessary to the signal processing operation.

4. The method of claim 1, wherein performing a digital signal processing operation comprises estimating a correlation.

5. The method of claim 4, wherein the correlation is estimated for at least 5,000 different time positions.

6. The method of claim 1, wherein maintaining linkage data comprises:
augmenting the least significant portions of the intermediate data results with a linkage bit; and
setting the linkage bits for the subset of the plurality of intermediate data results.

7. The method of claim 1, wherein maintaining linkage data comprises storing memory addresses into the second memory array along with the most significant portions, wherein the memory addresses correspond to locations within the first memory array of the corresponding least significant portions.

8. The method of claim 1 further comprising:
fetching least significant portions of the plurality of intermediate data results from the first memory;
fetching corresponding most significant portions of the subset of the plurality of intermediate data results from the second memory when a most significant portion has been stored in the second memory; and
extending a sign of the least significant portion of the plurality of intermediate data results when a corresponding most significant portion has not been stored in the second memory.

9. The method of claim 1 further comprising selecting the second length based on characteristics of the signal processing operation.

10. A device for reducing memory usage in a digital signal processing system comprising:
a digital signal processor configured to operate on a plurality of intermediate data results;
means for storing least significant portions of the plurality of intermediate data results;
means for selecting a subset of the plurality of intermediate data results that meet a predefined criteria, wherein the selected subset comprises less than all of the plurality of intermediate data results;
means for storing most significant portions of only the selected subset of the plurality of intermediate data results, wherein the most significant portions of the intermediate data results not in the selected subset are not stored in the second memory; and
means for reconstructing most significant portions of the subset of the plurality of intermediate data results upon retrieval of the corresponding least significant portions, wherein the means for reconstructing utilizes stored linkage data that links individual ones of the most significant portions stored by the means for storing most significant portions to its corresponding least significant portion stored by the means for storing least significant portions.

11. The device of claim 10 wherein the means for storing most significant portions of the subset of the plurality of intermediate data results comprises means for detecting an overflow in the least significant portions.

12. The device of claim 10 wherein the means for reconstructing most significant portions of the subset of the plurality of intermediate data results comprises means for extending a sign of the least significant portions.

13. The device of claim 10 wherein the digital signal processor is a correlator having at least 5000 taps.

14. A device for reducing memory usage in a signal processing system, the device comprising:
a signal processor having a memory interface for storage and retrieval of a plurality of intermediate data results, each of the intermediate data results being separable into a most significant portion and a least significant portion;
a first memory coupled to the memory interface to store the least significant portions of the plurality of intermediate data results, the first memory having a first width and a first length;
a second memory coupled to the memory interface to store the most significant portions of only a selected subset of the plurality of intermediate data results, the second memory having a second width and a second length, the second length being less than the first length, wherein the selected subset comprises less than all of the plurality of intermediate data results; and
a tracker coupled to the first memory and the second memory to maintain linkage data for each of the individual most significant portions of the intermediate data results stored in the second memory, wherein the linkage data links each individual one the most significant portions stored in the second memory to its corresponding least significant portion stored in the first memory.

15. The device of claim 14, wherein the signal processor is a correlator.

16. The device of claim 15, wherein the first length is at least 5000, each of 5000 memory locations within the first memory corresponding to a different time hypothesis for the correlator.

17. The device of claim 14, wherein the first memory and the second memory are memory devices chosen from the group consisting of random access memory, shift register memory, register file memory, first in first out memory, dual port memory, logic blocks within a field programmable gate array, and combinations thereof.

18. The device of claim 14, wherein the tracker comprises:
an overflow detector circuit configured to load a most significant portion of an input result into the second memory when an overflow of a least significant portion of the input result detected; and a sign extender circuit coupled to the first memory and configured to sign extend a least significant portion of an output result when no corresponding most significant portion of the output result is available from the second memory.

19. The device of claim 14, wherein the tracker comprises:

a counter coupled to the second memory, the second memory configured to store a stored count value of the counter when a most significant portion is written into the second memory and the second memory configured to output a most significant portion when a count value of the counter is equal to the stored count value.

20. The device of claim 14, wherein the first width is equal to width of the least significant portions.

21. The device of claim 14, wherein the second width is equal to width of the most significant portions.

22. The device of claim 14, wherein the second length is equal to or less than one tenth of the first length.

23. The device of claim 22, wherein the second length is equal to or less than one hundredth of the first length.

\* \* \* \* \*